United States Patent [19]

Hempel et al.

[11] Patent Number: 4,504,410
[45] Date of Patent: Mar. 12, 1985

[54] ORGANOPOLYSILOXANE ANTI-FOAMING AGENTS

[75] Inventors: Hans-Ulrich Hempel, Overath; Margarete Grünert, Kaarst; Holger Tesmann, Düsseldorf; Heinz Müller, Monheim, all of Fed. Rep. of Germany

[73] Assignee: Henkel Kommanditgesellschaft, Duesseldorf, Fed. Rep. of Germany

[21] Appl. No.: 389,261

[22] Filed: Jun. 17, 1982

[30] Foreign Application Priority Data

Jan. 7, 1982 [DE] Fed. Rep. of Germany ....... 3200206

[51] Int. Cl.$^3$ .......................... C09K 3/00; B01D 17/00
[52] U.S. Cl. ..................................... 252/358; 252/321
[58] Field of Search ................. 252/321, 358; 423/228, 423/229; 556/400, 439, 450, 462, 467

[56] References Cited

U.S. PATENT DOCUMENTS

| 3,712,868 | 1/1973 | Saunders | 252/321 |
| 3,784,479 | 1/1974 | Keil | 252/321 |
| 3,984,347 | 10/1976 | Keil | 252/321 |
| 4,082,690 | 4/1978 | Farminer | 252/358 |
| 4,145,308 | 3/1979 | Simoneau et al. | 252/321 |
| 4,186,104 | 1/1980 | Pirson et al. | 252/321 |
| 4,313,917 | 2/1982 | Ohta | 252/321 |
| 4,396,524 | 8/1983 | Hempel et al. | 252/321 |
| 4,405,490 | 9/1983 | Maas et al. | 252/321 |

FOREIGN PATENT DOCUMENTS

| 2345335 | 10/1975 | Fed. Rep. of Germany . |
| 2443853 | 1/1976 | Fed. Rep. of Germany . |
| 2534250 | 1/1976 | Fed. Rep. of Germany . |
| 2518053 | 11/1976 | Fed. Rep. of Germany . |
| 2829906 | 1/1979 | Fed. Rep. of Germany . |
| 3011304 | 8/1981 | Fed. Rep. of Germany . |

Primary Examiner—Stephen J. Lechert, Jr.
Assistant Examiner—Howard J. Locker
Attorney, Agent, or Firm—Ernest G. Szoke; Henry E. Millson, Jr.; Mark A. Greenfield

[57] ABSTRACT

Organopolysiloxanes of the formula:

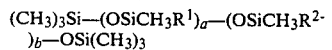

$(CH_3)_3Si-(OSiCH_3R^1)_a-(OSiCH_3R^2-)_b-OSi(CH_3)_3$ wherein $R^1$ is a $C_6$–$C_{10}$ alkyl group and $R^2$ is the group—$(CH_2)_dCOO$ $(CH_2CHZ-O)_e$—$R^3$; and wherein $R^3$ is a $C_1$–$C_6$ alkyl group, Z is hydrogen or methyl, a is the whole number 28 to 36, b is the whole number 5 to 12, d is the whole number 8 to 12, and e is the whole number 1 to 24. These organopolysiloxanes are useful as antifoaming agents and are especially useful in aqueous paint compositions.

8 Claims, No Drawings

ORGANOPOLYSILOXANE ANTI-FOAMING AGENTS

BACKGROUND OF THE INVENTION

Aqueous synthetic resin solutions and dispersions which are used as bonding compositions for printing inks, wood and metal paints, and coatings for paper and synthetics, are usually based on water soluble alkyl resins, polyacrylates, or polyesters. Alkyd resins are those with a carboxyl group, such as maleic acid, modified oils, oil modified alkyds, and oil free polyesters. In addition to a neutralizing agent component, usually an amine such alkyl resin compositions also usually contain a co-solvent. Paints based on polyacrylates are usually copolymers of acrylic acid derivatives, which can be combined with melamine- or urea resins, or combined with polyurethanes. Modified, unsaturated polyester compounds present in the form of an emulsion are usually used as polyester resin solutions.

Such bonding compositions develop foaming problems during manufacture and use due to the presence of emulsifiers and salt forming carboxyl groups. As a rule, such foaming problems cannot be solved by the use of known defoaming agents. Therefore, when using the prior art alkyl polysiloxanes in the form of an emulsion or solution in hydrocarbons in paint compositions, severe surface problems occur on the painted surfaces which are known to the expert as crater, fish eyes, and orange peel effects. Another disadvantage is that paint mixtures containing silicic acid or aluminum oxide will quickly settle out and lower the surface luster in glossy paints. The addition of other known foam inhibiting agents such as those based on mineral oils or ester oils with long chain, linear fatty acids, even with the addition of emulsifiers, are still not compatible with the bonding compositions, and weeping on the painted surface will occur. German Patent Nos. DE-OS 23 45 335, DE-OS 24 43 853, DE-OS 25 18 053, DE-OS 25 34 250, and DE-OS 28 29 906 disclose polysiloxanes and polysiloxane copolymers that exhibit greater polarity, and after adding silicon oxide or aluminum oxide, or after their dissolution in organic solvents, such as low-molecular glycols, ketones, or esters, a spontaneous defoaming action occurs. However, these compositions still exhibit the above cited disadvantages due to their mineral additive content.

German Patent No. DE-OS 30 11 304 discloses mixtures consisting of polysiloxane-polyether-block polymers, mineral oils or fatty acid esters, emulsifiers, and fatty acid alkaline earth metal and aluminum soaps. Such mixtures can be used for defoaming synthetic resin dispersions and clear lacquers; they are also effective in the absence of silicon dioxide.

DETAILED DESCRIPTION OF THE INVENTION

The present invention relates to organopolysiloxanes of the general formula:

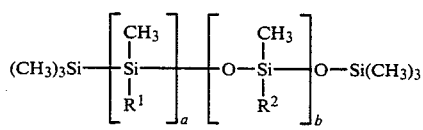

(I)

wherein $R^1 = -(CH_2)_c-CH_3$
$R^2 = -(CH_2)_d-COO(CH_2-CHZ-O)_e-R^3$
$R^3 = $ a $C_1$-$C_6$ straight or branched chain alkyl group
$Z = H$ or $CH_3$
a = a whole number from 28 to 36 inclusive
b = a whole number from 5 to 12 inclusive
c = a whole number from 5 to 9 inclusive
d = a whole number from 8 to 12 inclusive
e = a whole number from 1 to 24 inclusive.

Preferred are compounds wherein c=7 and d=10. Also, compounds are preferred wherein $R^2$ is the following group:

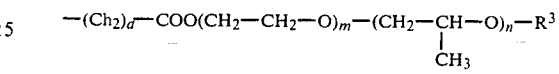

in which m is a whole number from 1 to 12 inclusive, n is an integer from 0 to 12 inclusive, and d and $R^3$ have the meanings given above.

The organopolysiloxanes of Formula I are prepared by reacting a methylpolysiloxane of Formula II:

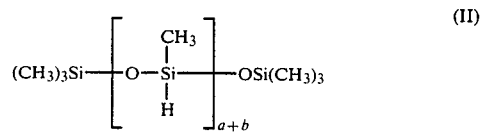

(II)

with an olefin of Formula III:

$$CH_2=CH-(CH_2)_{c-2}-CH_3 \qquad (III)$$

and an ester of a straight chain unsaturated carboxylic acid of Formula IV:

$$CH_2=CH-(CH_2)_{d-2}-COOR^3 \qquad (IV)$$

in the presence of a catalyst such as hexachloroplatinic acid at a temperature above about 80° C., preferably from about 100° C. to about 180° C.

The ester group —$COOR^3$ is then transesterified by transesterification with a monoalkylated polyglycol of Formula V:

$$HO-(CH_2-CHZ-O)_e-R^3 \qquad (V)$$

followed by removal of the $R^3OH$ alcohol produced by the transesterification reaction In the above reaction sequences, a, b, d, e, Z, and $R^3$ have the same meanings as given above for the compounds of Formula I. In the above reaction sequence, the olefin of Formula III is preferably n-octene-1, and the ester of a straight chain unsaturated carboxylic acid of Formula IV is preferably undecylenic and methyl ester.

The organopolysiloxanes of Formula I are very effective foam inhibitors, and do not require the addition of a finely dispersed silicon dioxide or an aluminum dioxide. The compounds of Formula I are especially useful as defoamers in aqueous paint systems, since in contradistinction to the known mineral oxide-containing siloxane defoamers, they will not reduce the surface gloss of painted coatings. Accordingly, another feature of this invention is the use of the present organopolysiloxanes in aqueous dispersions and solutions of synthetic resins, such as alkyd resins, polyacrylates, or polyesters, and the compositions resulting therefrom.

The organopolysiloxanes of Formula I can be used without any additional additives. Alternatively, they may be mixed with polar solvents such as low molecular weight alcohols, ethers, glycols, oligomeric glycol ethers, mono- or dialkylated glycols, ketones, and neutral esters of low molecular mono- or dicarboxylic acids or mixtures of such polar solvents. Examples of the above include ethanol, propanol, i-propanol, butanol, ethylene glycol, propylene glycol, butylene glycol, mono-$C_{1-4}$-alkyl ether of di-$C_{1-4}$-alkyl ether of ethylene-propylene or butylene glycol and their oligomers, polyethylene or polypropylene glycols with an average of 2 to 10 glycol ether units, methyl ethyl ketone, ethylacetate, propyl acetate.

In addition, the organopolysiloxanes of the present invention can be mixed with known defoamers of other chemical compositions, thereby obtaining economic savings without suffering any significant loss of defoaming action. Especially useful in such mixtures are neutral esters of saturated or unsaturated straight chain or branched chain mono- or dicarboxylic acids having from 4 to 12 carbon atoms, which are esterified with branch chain monoalcohols having from 4 to 12 carbon atoms. Suitable carboxylic acids for the acid component of the above esters are fatty acids such as butyric, valeric, caproic, enanthic, caprylic, pelargonic, capric, lauric, and undecylenic. Also suitable are methyl branched chain fatty acids from the oxo process or iso acids such as isooctanoic, isononanoic, and isodecanoic acid, ethyl branched chain fatty acids having the methyl group in the 2 position, such as 2-ethyl hexanoic acid, and 2-ethyl decanoic acid. Dicarboxylic acids that are suitable include succinic, maleic, glutaric, adipic, pimelic, suberic, azelaic, sebacic, and dodecane dianoic acids.

The alcohol component of the above esters is a branch chain saturated or unsaturated monoalcohol having from 4 to 12 carbon atoms. Suitable are isobutanol, isoamyl alcohol, isohexanol, isoheptanol, isooctanol, 2,2,4-trimethyl-pentanol-1,2,6-dimethyl heptanol-4, 2,6,8-trimethylnonanol-4, as well as methyl branched $C_4$–$C_{12}$-alkanols from the oxy process and "Guerbet alcohols" such as 2-ethyl hexanol and 2-propyl heptanol.

Mixtures of two or more carboxylic acid esters having different acid and/or alcohol radicals can also be used herein.

Defoaming mixtures consisting of an organopolysiloxane of Formula I and one or a mixture of the above esters can have a quantity of esters therein of up to 98 wt. %. Preferred are mixtures containing from about 10 to about 50 wt. % of an organopolysiloxane of Formula I and about 50 to about 90 wt. % of ester, based on the total weight of organopolysiloxane and ester.

The addition of the present defoaming agents of Formula I and defoaming mixtures containing a compound of Formula I to an aqueous synthetic resin dispersion does not pose any particular problems. The resulting mixture can also be homogenized without any problem. The amount of the present defoaming agent or mixture to be added to such dispersions will depend on the amount of foam generated when processing the dispersions. In general, from about 0.05 to about 3 wt. %, preferably about 0.1 to about 1.5 wt. % are employed in relation to the weight of dispersion or solution.

The invention will be better understood from the following examples which are given for illustration purposes only.

EXAMPLE 1

1120 g (10 moles) of n-octene-1, 396 g (2 moles) of undecylenic acid methyl ester and 25 mg hexachloroplatinic acid hydrate (platinum content 37 wt. %; present as a saturated solution in diethyleneglycol dimethylether) were stirred (nitrogen atmosphere) at 120° C. During a 3-hour period, 600 g of a methyl hydrogenpolysiloxane of Formula III (a+b=40) was added. After addition was completed, the reaction temperature was raised to 150° C., and kept at this temperature for 3 hours. Afterwards, a sample from the reaction mixture was withdrawn; the infrared spectrum thereof showed hardly any Si-H bonds. The reaction mixture was then distilled to a pot temperature of 220° C. at 18 mbar in order to remove any excess n-octene-1 and undecylenic acid methyl ester. The product obtained had a saponification number of 56.0; it can be calculated that a=33 and b=7.

To 200 g of this product, 62 g of monoethyl polyglycol ether of Formula V with e=6, Z=H, and $R^3=C_2H_5$ was added. (This compound of Formula V was obtained by the addition of ethylene oxide to ethanol (molar ratio 6:1), plus 3 g of toluene-4-sulfonic acid and 3 g of activated charcoal). The resulting mixture was heated with stirring to 160° C. for 2 hours in a nitrogen atmosphere. During this period, some of the methanol that had formed during the reaction distilled off. The pressure in the equipment was then lowered for 5 minutes to 18 mbar in order to remove additional methanol. The sample was then kept for another hour at 160° C. under normal pressure, and then cooled. While cooling, 3 g of tributyl amine was added at 100° C. in order to neutralize the catalyst. After standing overnight, the product was filtered in order to remove the precipitated tributyl ammonium-toluene-4-sulfonate. The obtained clear end product had a viscosity of 225 cps. (Brookfield, 22° C.).

EXAMPLE 2

A reaction was carried out in the same manner as described in Example 1, with the same ingredients, quantities thereof, and reaction conditions, except that the transesterification step was carried out using monoethylpolyethylene glycol ether (e=4). The reaction product was an organopolysiloxane with a=32 and b=8. The product had a viscosity of 240 cps. (Brookfield, 22° C.).

EXAMPLE 3

A reaction was carried out in the same manner as described in Example 1, except that the transesterification step was carried out with monoethylpolyethylene glycol ether (e=8). An organopolysiloxane with a=34 and b=6 was obtained; viscosity 245 cps. (Brookfield, 22° C.).

EXAMPLE 4

Using the process conditions of Example 1, 1064 g (9.5 moles) of n-octene-1 and 49.5 g (2.5 moles) of undecylenic acid methyl ester were reacted with 600 g of methyl hydrogen polysiloxane (a+b=40), in the presence of hexachloroplatinic acid. After completion of the reaction and separation of the excess octene and esters, 200 g of the resulting product were transesterified with 99 g of an adduct of propylene oxide and ethylene oxide with n-butanol having the formula $HO-(C_2H_4-O)_6-(C_3H_6-O)_3-C_4H_9$ using the procedure described in Example 1.

An organopolysiloxane with $a=31$, and $b=9$ was obtained; viscosity 280 cps. (Brookfield, 22° C.).

EXAMPLE 5

20 wt. % of an organopolysiloxane obtained in Examples 1 to 4 were each separately mixed with 80 wt. % of diisobutyladipate to form four defoaming compositions. Portions of these defoaming compositions were then separately mixed with a quantity of an aqueous synthetic resin dispersion to give four dispersions of each of the following paint compositions (percentages are given in wt. %):

A. Alkyd resin paint
  22.5% soybean oil alkyd resin (modified isocyanate)
  1.4% trimethylamine
  4.4% ethyl glycol
  0.3% butyl glycol
  43.3% D.I. water
  24.6% pigments (TiO₂, aluminum silicate, dolomite, and talcum)
  0.4% thickening agent
  1.4% of a defoaming composition prepared above.

The above alkyl resin paint is a white-pigmented corrosion resistant base coat paint.

B. Polyacrylate Paint
  73.8% polyacrylate-bonding material (Rhoplex WL81)
  12.6% D.I. water
  12.3% butyl glycol
  1.45% paint additive (film forming and slip enhancer)
  0.15% of a defoaming composition prepared above.

This paint is a non-pigmented air-drying paint dispersion for metal, synthetic, or wood surfaces.

C. Baking Enamel for Metal
  3.77% Melamine resin (hardener)
  0.31% dimethylethanolamine
  10.75% D.I. water
  0.88% ethanol
  27.34% titanium oxide
  50.29% bonding material (Synresyl TP 141 DF)
  1.10% coating forming additive
  4.56% ethylene glycol
  1.0% of a defoaming composition prepared above.

A surgical knife test was performed on the following bases:
  (a) steel plates (deep drawing material)
  (b) wooden plates (nut tree-veneer)
  (c) glass plates.

Each of the twelve paint samples prepared above was mixed in a mixing apparatus, a so-called dissolver, for 2 minutes at 2000 revolutions/minute, and then transferred into film drawdown equipment where at a constant speed the film was applied slowly to an individual flat plane. The film thicknesses were 200 microns and 500 microns.

This "knife test" was repeated after storing the dispersions at room temperature for 4 weeks, in order to evaluate storage, stability and constant efficiency of the defoamer used.

The obtained coating was then either air or furnace dried; any air bubbles, flasw in continuity or silicon interferences were visually assessed.

Contrary to mineral oil-containing defoamer formulations, excellent results with no failures were observed in all of the above tests. No problems on the surface or loss of gloss were observed on any test sample.

We claim:

1. An organopolysiloxane of the formula

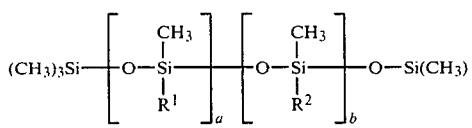

wherein
  $R^1 = -(CH_2)_c-CH_3$
  $R^2 = -(CH_2)_d-COO(CH_2-CHZ-O)-R_e-R^3$
  $R^3 =$ a $C_1$-$C_6$ straight or branched chain alkyl group
  $Z = H$ or $CH_3$
  $a =$ a whole number from 28 to 36 inclusive
  $b =$ a whole number from 5 to 12 inclusive
  $c =$ a whole number from 5 to 9 inclusive
  $d =$ a whole number from 8 to 12 inclusive
  $e =$ a whole number from 1 to 24 inclusive.

2. An organopolysiloxane in accordance with claim 1 wherein $c=7$ and $d=10$.

3. An organopolysiloxane in accordance with claim 1 or 2 wherein $R^2$ is the group:

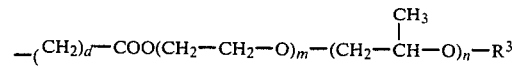

wherein $m =$ a whole number from 1 to 12 inclusive, $n =$ an integer from 0 to 12 inclusive, and d and $R^3$ have the meanings given in claim 1.

4. A process for the manufacture of an organopolysiloxane of the formula

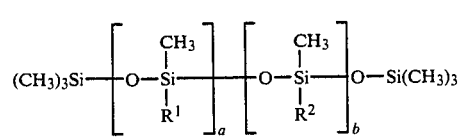

(I)

wherein
  $R^1 = -(CH_2)_c-CH_3$
  $R^2 = -(CH_2)_d-COO(CH_2-CHZ-O)_e-R^3$
  $R^3 =$ a $C_1$-$C_6$ straight or branched chain alkyl group
  $Z = H$ or $CH_3$
  $a =$ a whole number from 28 to 36 inclusive
  $b =$ a whole number from 5 to 12 inclusive
  $c =$ a whole number from 5 to 9 inclusive
  $d =$ a whole number from 8 to 12 inclusive
  $e =$ a whole number from 1 to 24 inclusive, comprising the steps of (a) reacting a methylpolysiloxane of Formula II

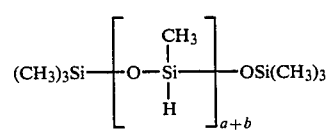

(II)

with an olefin of Formula III $CH_2=CH-(CH_2)_{c-2}-CH_3$ (III)

and an ester of a straight chain unsaturated carboxylic acid of Formula IV $$CH_2=CH-(CH_2)_{d-2}-COOR^3 \quad (IV)$$

in the presence of a catalyst at a temperature above about 80° C.; and (b) transesterifying the reaction product from step (a) by reacting said reaction product with a monoalkylated polyglycol of Formula V $$HO-(CH_2-CHZ-O)_e-R^3 \quad (V)$$

wherein in the above reaction sequence, a, b, c, d, e, Z, and $R^3$ have the meanings given above.

5. A process in accordance with claim 4 wherein in the compounds set forth therein c=7 and d=10.

6. A process in accordance with claim 4 wherein the $R^2$ group in the organopolysiloxane of Formula I is the group:

$$-(CH_2)_d-COO(CH_2-CH_2-O)_m-(CH_2-\overset{\underset{\displaystyle CH_3}{|}}{CH}-O)_n-R^3$$

wherein m=a whole number from 1 to 12 inclusive, n=an integer from 0 to 12 inclusive, and d and $R^3$ have the meanings given in claim 4.

7. A process in accordance with claim 4, 5 or 6 wherein the reaction temperature in step (a) is selected from the range of from about 100° to about 180° C.

8. A process in accordance with claim 4, 5 or 6 wherein the catalyst in step (a) is hexachloroplatinic acid.

* * * * *